(12) United States Patent
Song et al.

(10) Patent No.: US 12,396,042 B2
(45) Date of Patent: Aug. 19, 2025

(54) CELL-LESS WIRELESS NETWORK

(71) Applicant: Verizon Patent and Licensing Inc., Basking Ridge, NJ (US)

(72) Inventors: Lei Song, Basking Ridge, NJ (US); Edward Diaz, Bridgewater, NJ (US); Jin Yang, Orinda, CA (US); Zheng Zhao, Plainsboro, NJ (US); Mamadou Mamoune Niang, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 394 days.

(21) Appl. No.: 17/699,480

(22) Filed: Mar. 21, 2022

(65) Prior Publication Data

US 2023/0300904 A1 Sep. 21, 2023

(51) Int. Cl.
*H04L 5/00* (2006.01)
*H04B 7/024* (2017.01)
*H04B 7/06* (2006.01)
*H04W 56/00* (2009.01)
*H04W 76/10* (2018.01)
*H04W 84/04* (2009.01)
*H04W 88/08* (2009.01)

(52) U.S. Cl.
CPC .......... *H04W 76/10* (2018.02); *H04B 7/0695* (2013.01); *H04W 56/001* (2013.01); *H04W 84/04* (2013.01); *H04W 88/08* (2013.01)

(58) Field of Classification Search
None
See application file for complete search history.

(56) References Cited

U.S. PATENT DOCUMENTS

| 2020/0145154 | A1* | 5/2020 | Black | H04L 5/0035 |
| 2021/0329515 | A1* | 10/2021 | Sharma | H04W 36/0061 |
| 2022/0039085 | A1* | 2/2022 | Harada | H04W 48/10 |
| 2022/0295516 | A1* | 9/2022 | Matsumura | H04W 72/1263 |
| 2022/0302994 | A1* | 9/2022 | Sharma | H04B 7/0695 |
| 2022/0393752 | A1* | 12/2022 | Laddu | H04B 7/0632 |
| 2023/0006713 | A1* | 1/2023 | Zirwas | H04B 7/0617 |
| 2023/0054824 | A1* | 2/2023 | Abedini | H04B 17/252 |
| 2023/0056240 | A1* | 2/2023 | Lee | H04B 7/0452 |

* cited by examiner

*Primary Examiner* — Sithu Ko

(57) ABSTRACT

A radio access network (RAN) may comprise at least one transmission-reception point (TRP) configured to provide wireless connections to one or more User Equipment devices (UEs) in an area. The area is not predefined by a cell boundary. The RAN may be configured to: broadcast Scheduling and Synchronization Relation (SSR) information to a UE; and establish with the UE a transmission mode for the TRP.

20 Claims, 8 Drawing Sheets

CELL-LESS WIRELESS NETWORK

BACKGROUND INFORMATION

A cellular network operates based on omnidirectional signal coverage of geographical areas. A cell is an area covered by signals from a transmission point or a reception point and has a boundary defined based on signal attenuation.

DETAILED DESCRIPTION OF EMBODIMENTS

Figure 1:
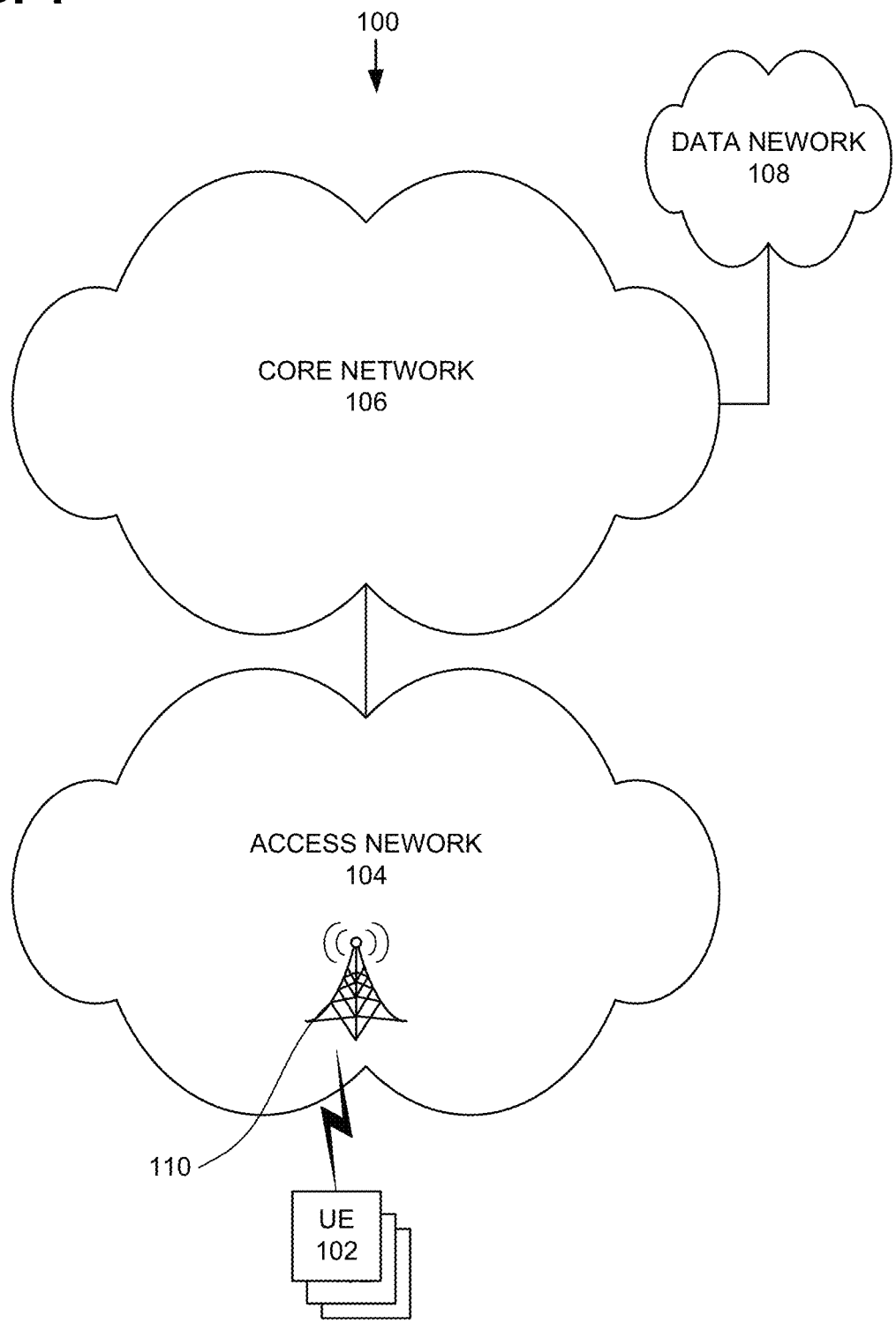
FIG. 1 illustrates an example network environment in which systems and methods described herein may be implemented.

The following detailed description refers to the accompanying drawings. The same reference numbers in different drawings may identify the same or similar elements.

The systems and methods described herein relate to cell-less wireless networks. Currently, User Equipment devices (UEs) may use one or more technologies to wirelessly connect to a cellular network. For example, a UE may attach to a Fifth Generation (5G) base station (e.g., next generation Node B or gNB) and an evolved Node B (eNB) using Dual-Connectivity (DC) technology, Carrier Aggregation (CA), and/or multiple Transmission and Reception points (TRPs) that provide either non-coherent joint transmissions and multiple Downlink Control Information blocks (DCIs) or coherent joint transmissions and a single DCI. Various aspects of DC, CA and multi-TRP may be configured through Radio Resource Control (RRC). Adopting these connectivity technologies individually incurs significant implementation and operational costs and increases the complexity of the cellular network. The cell-less wireless network as described herein allows UEs to connect to a wireless network using a single framework that unifies significant features of DC, CA, and multi-TRPs with minimal technological overlaps.

In addition, today's radio access networks (RANs) are transitioning from distributed RAN (D-RAN) architectures to virtual Radio Access Network (V-RAN) or cloud RAN (C-RAN) architectures. D-RAN architectures impose limitations on network operation and its adaptability, thus slowing the growth of wireless network ecosystems. V-RAN and C-RAN virtualize and centralize the network resources (e.g., processing capabilities and scheduling control) into pools that may be dynamically shared among network elements for increased efficiency and for improved ecosystem growths. However, current V-RAN and C-RAN technological improvements are focused mostly on network requirements and have yet to significantly impact the radio interfaces and provide further improvements in overall network efficiency. Cell-less wireless network implementations provide mechanisms to optimize the operation of air-links of the V-RANs and/or C-RANs by removing the legacy barriers (e.g., assignment of cells to base stations) and by treating connections as pools of resources that can be dynamically shared by wireless stations and UEs.

In implementations described herein, a cell-less wireless network operates without cells (e.g., bounded areas that are assigned to particular base stations for communication services). That is, a base station that belongs to the wireless network may manage UEs in an area that is not within a boundary of a typical cell (e.g., an area not predefined or defined by a cell boundary). Once a UE accesses the wireless network, the UE is serviced by beams from different TRPs selected from a pool of activated TRPs. Each pool of such TRPs can be operated for a particular RAN architecture, such as V-RAN or C-RAN architecture. The TRPs may be adaptively maintained through different activation and deactivation processes.

In the implementations described herein, DC, CA, multi-TRPs with array antennas or legacy discrete antennas are aggregated or unified into a single framework that focuses on network synchronization and scheduling characteristics, such as backhaul data synchronization and/or transmission timing.

The implementations described herein streamline and thus reduce wireless network operational complexity, reduce cost, and set paths to further evolution of the wireless network. In addition, the implementations may improve user experience by reducing latency, UE operational complexity, and power consumption. Furthermore, the implementations are well-suited to be adapted for C-RAN and/or V-RAN architectures—akin to air link advantages inherent in C-RAN and/or V-RAN networks. Additionally, the implementations provide interfaces to beam-based controls in C-band and millimeter wave (mmWave) band operations.

FIG. 1 illustrates an example network environment 100 according to an implementation. As shown, network environment 100 may include UEs 102 (individually and generically referred to as UE 102 and collectively as UEs 102), an access network 104, a core network 106, and a data network 108. UE 102 may include, for example, a wireless communication device, a mobile terminal, or a fixed wireless access (FWA) device. Examples of UE 102 include: a smart phone; a tablet device; a wearable computer device (e.g., a smart watch, smart glasses); a laptop computer; an autonomous vehicle with communication capabilities; a portable gaming system; an Internet-of-Thing (IoT) device and/or other devices with processing and communication capabilities.

In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 104. UE 102 may have the capability to connect to different Radio Access Technology (RAT) access devices, such as LTE or 5G base stations.

UE 102 may include components to support multiple transmission (TRX) chains. Depending on the implementation, UE 102 may have varying degrees of transmission and reception processing capabilities, such as capabilities to perform: packet timing, physical signal timing (e.g., modify timing advance parameters), multi-input multi-output (MIMO) multi-layer communications using multiple frequency layers, and joint processing of multiple streams. UE 102 may select and/or control its transmission mode based on information about channels to each of the transmission points (e.g., a base station, a radio unit, etc.) in access network 104. For example, UE 102 may determine a transmission mode that maximizes a particular parameter. For example, UE 102 may identify one or more channels (e.g., different beams and/or frequency bands) with the maximum power, maximum throughput, minimum latency, minimum noise/interference, signal-to-interference and noise-ratio (SINR), etc.

Access network 104 may allow UE 102 to access core network 106. To do so, access network 104 may establish and maintain, with participation from UE 102, an over-the-air channel with UE 102; and maintain backhaul channels (not shown) with core network 106. Access network 104 may convey information through these channels, from UE 102 to core network 106 and vice versa.

Access network 104 may include an LTE radio access network, a Next Generation (NG) radio access network (e.g., a 5G radio access network) and/or another advanced radio network. These radio networks may operate in many frequency ranges, including millimeter wave (mmWave) frequencies, sub 6 GHz frequencies, and/or other frequencies. Access network 104 may include many wireless stations, Central Units (CUs), Distributed Units (DUs), and Radio Units (RUs). The wireless stations, CUs, DUs, and/or RUs nodes may establish and maintain over-the-air channels with UEs 102 and backhaul channels with core network 106. In FIG. 1, the wireless stations, CUs, DUs, and RUs are collectively depicted as wireless station 110.

Wireless station 110 may include a 5G, 4G, or another type of wireless station (e.g., evolved Node B (eNB), next generation Node B (gNB), etc.), CUs, DUs, and RUs. Wireless station 110 (also referred to as base station 110) may provide or support one or more of the following: 4 Tx functions (e.g., 4 transceiver antenna function); carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; DC, and other types of LTE-Advanced (LTE-A) and/or 5G-related functions. In some implementations, wireless station 110 may be part of an evolved Universal Mobile Telecommunications System (UMTS) Terrestrial Network (eUTRAN). Wireless station 110 may include Remote Electronic Tilt (RET) capability for beam steering or beam shaping.

In one implementation, access network 104 may include the framework in which network components for DC, CA, and multi-TRPs (with array antennas or legacy discrete antennas) are aggregated or unified. The framework provides network synchronization and scheduling characteristics, such as backhaul data synchronization and/or transmission timing. One example of such a framework is described below with reference to FIG. 3.

Core network 106 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a public land mobile network (PLMN), or a combination of networks. Core network 106 may allow the delivery of Internet Protocol (IP) services to UE 102 and may interface with other networks, such as data network 108.

Depending on the implementation, core network 106 may include 4G core network components (e.g., a Serving Gateway (SGW), a Packet data network Gateway (PGW), a Mobility Management Entity (MME), a Home Subscriber Server (HSS), an Authentication Authorization and Accounting (AAA) server, a Policy and Charging Rules Function (PCRF), etc.) and/or 5G core network components. The 5G core network components may include, for example, a Unified Data Management (UDM), an Access and Mobility Management Function (AMF), an Authentication Server Function (AUSF), a Unified Data Repository (UDR), a Policy Control Function (PCF), a Session Management Function (SMF), a User Plane Function (UPF), etc.

Data network 108 may include networks that are external to core network 106. In some implementations, data network 108 may include packet data networks, such as an Internet Protocol (IP) network. In another implementation, data network 108 may be part of core network 106. Data network 108 may provide particular network services, such as, for example, Voice-over-IP (VoIP) services, messaging services, video services, etc.

For simplicity, FIG. 1 does not show all components that may be included in network environment 100 (e.g., routers, bridges, wireless access points, additional networks, additional UEs 102, wireless stations, CUs, DUs, RUs, etc.). These components and the components described above may be connected to one another by either wireless links or physical links. Also, depending on the implementation, network environment 100 may include additional, fewer, different, or a different arrangement of components than those illustrated in FIG. 1.

Figure 2A:
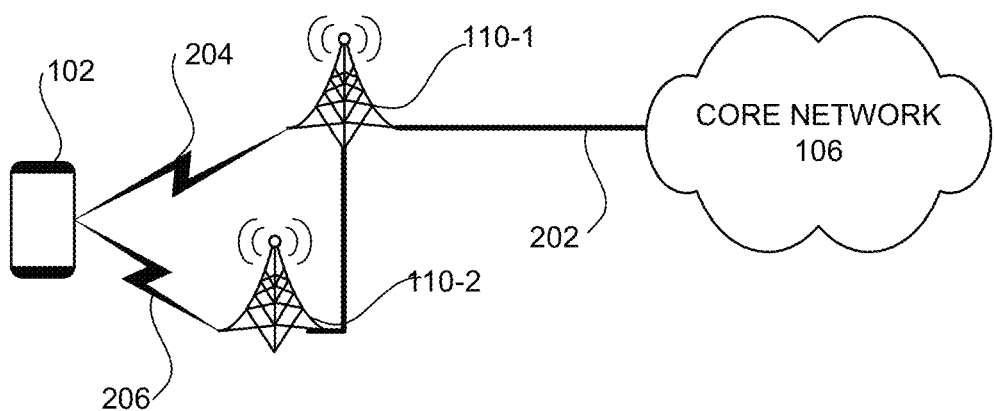
FIG. 2A illustrates exemplary dual connectivity (DC) according to an implementation.
Figure 2B:
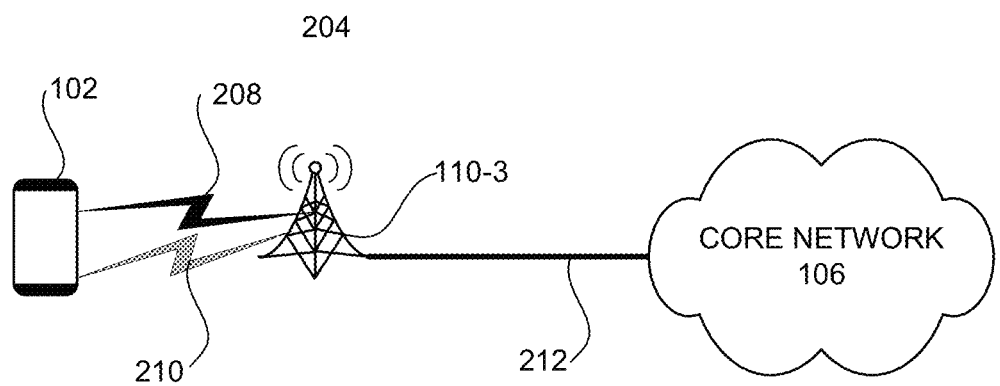
FIG. 2B illustrates exemplary carrier aggregation (CA) according to an implementation.
Figure 2C:
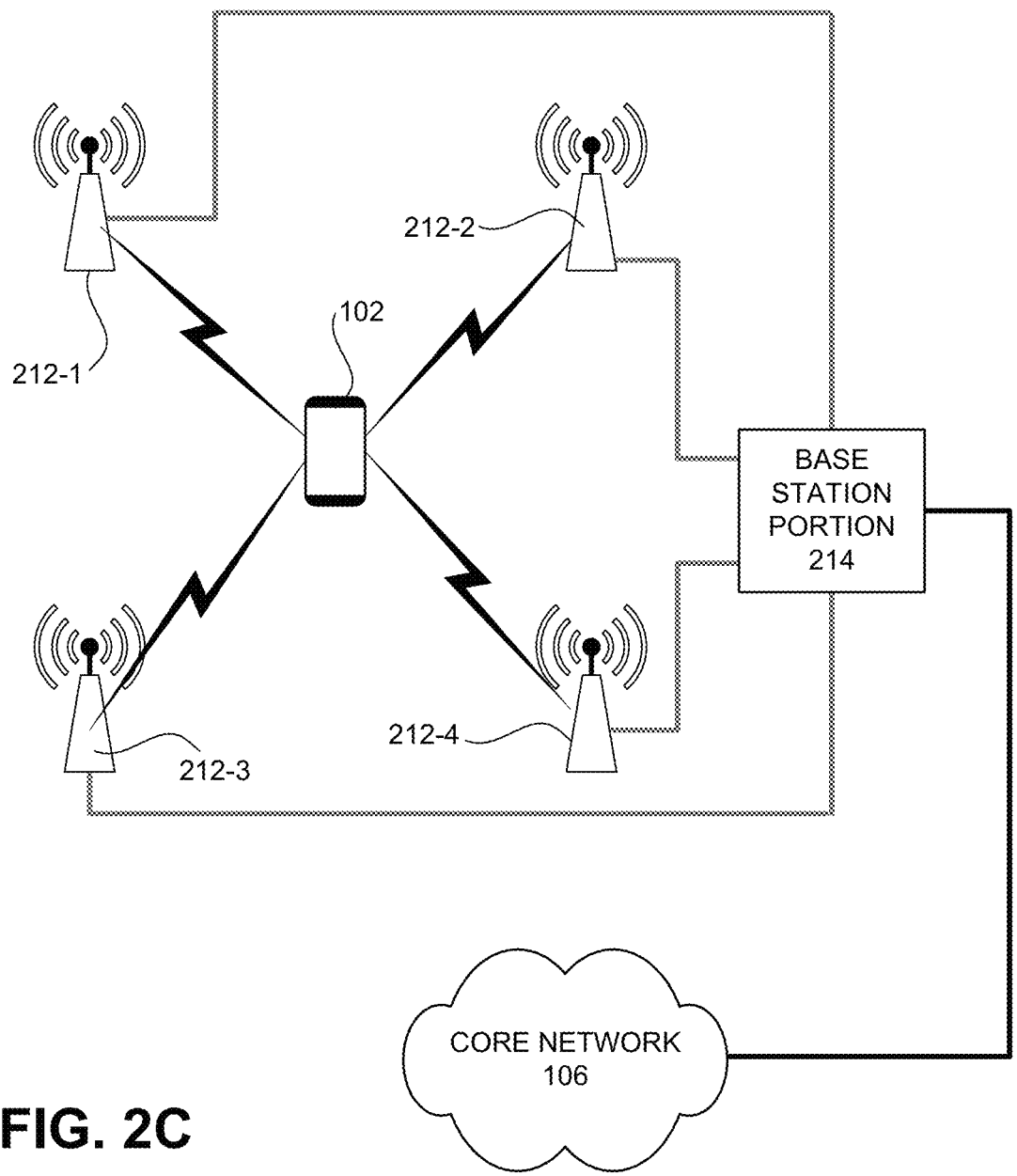
FIG. 2C illustrates exemplary multiple transmission-reception points (multi-TRPs) according to an implementation.

As indicated above, access network 104 may include the framework with components for and/or components that aggregate technologies for DC, CA, and multi-TRPs with array antennas or legacy discrete antennas). FIGS. 2A-2C illustrate DC, CA, and multi-TRPs according to different implementations.

FIG. 2A illustrates Dual Connectivity (DC), with two base stations 110-1 and 110-2. Base station 110-1, which is attached to core network 106 through a backhaul 202, is herein referred to as a master base station or a master cell group (e.g., a Master gNB (MgNB), a Master eNB (MeNB), etc.). Base station 110-2, herein referred to as a secondary base station or a secondary cell group (e.g., a Secondary gNB (SgNB), a Secondary eNB (SeNB), etc.), is linked to master base station 110-1. In this scheme, UE 102 may wirelessly connect to both of stations 110-1 and 110-2 through different RF links 204 and 206.

Depending on the implementation, establishment and maintenance of link 204 and link 206 may entail use of different Radio Access Technologies (RATs) or the same RAT (e.g., NG Radio or LTE RAT). For example, base station 110-1 may be implemented as a master gNB (MgNB) or a master eNB (MeNB). In either case, base station 110-1 may coordinate transmission of data at base stations 110-1 and 110-2, to achieve optimum data throughput or to provide link redundancy. That is, base station 110-1 synchronizes data that is to be transmitted from/received at base station 110-1 to/from UE 102 and data that is to be transmitted from/received at base station 110-2 to/from UE 102.

FIG. 2B illustrates Carrier Aggregation (CA), with base station 110-3 connected to core network 106 via backhaul 212. UE 102 establishes a link with a primary carrier component (PCC) 208 and a secondary carrier component (SCC) 210. To send downlink (DL) data to UE 102, base station 110-3 schedules the data for transmission at a Media Access Control (MAC) layer. Furthermore, base station 110-3 assembles data received from UE 102 at the MAC layer. That is, any data synchronization is performed at the MAC layer. In contrast, for DC, data separation/synchronization is performed at the master base station 110-1, at a communication layer that is above the MAC layer (e.g., at Packet Data Convergence Protocol (PDCP) layer).

FIG. 2C illustrates multiple transmission-reception points (multi-TRPs). In FIG. 2C, base station 110 includes a base station portion 214 and transceivers 212-1 through 212-4. Each transceiver 212 may transmit a signal to UE 102. Depending on the implementation, transceivers 212 may act as a coordinated multipoint (CoMP) to provide coherent joint transmission (CJT) that shape the overall beam to UE 102. Such a coherent beam may provide signal spatial diversity. If the signals are non-coherent (i.e., non-coherent joint transmission (NCJT)), each of the signals may follow/provide different signal paths to UE 102. Providing path redundancy.

Figure 3:
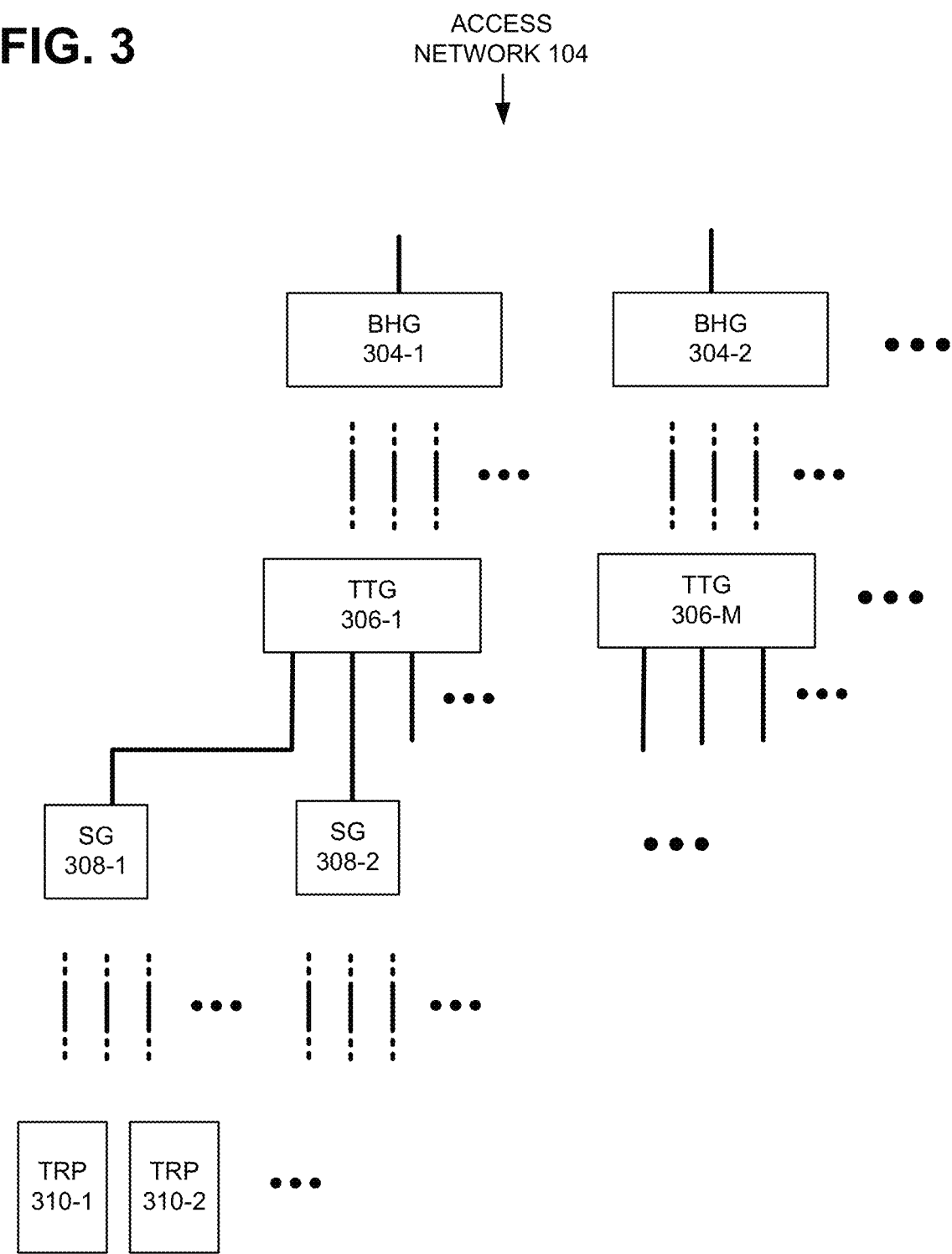
FIG. 3 shows an exemplary framework for an access network according to an implementation.

FIG. 3 shows an exemplary framework for an access network 104 according to an implementation. The framework unifies and/or aggregates processes and components for achieving data synchronizations, scheduling, and signal timing in DC, CA and multi-TRP illustrated in FIGS. 2A-2C. As shown, access network 104 may comprise backhaul groups (BHGs) 304-1, 304-2, etc. Each BHG 304 corresponds to synchronized or non-synchronized backhauls. Access network 104 may also include transmission timing groups (TTGs) 306. Each TTG 306 (any of TTG 306-1, 306-2, etc.) is capable of being time synchronized, Each TTG may connect to one or more BHGs, and conversely, each BHG may connect to one or more TTGs. Each TTG may be connected to one or more scheduling groups (SGs) 308-1, 308-2, etc. Each SG 308 may connect to one or more of TRPs 310-1, 310-2, etc. SG 308 jointly may schedule resource elements that are to be transmitted via TRPs 310, as non-joint coherent transmission or a coherent joint transmission. One or more TRPs 310 may be attached to the same piece of hardware that enables coherent transmission at the TRPs 310.

In the implementation of FIG. 3, TTG 306, SGs 308, and TRPs 310 are not assigned to a particular a cell (a fixed geographical area in which UEs 102 are serviced by a wireless station). For example, a TRP 310 may provide connections (from access network 104) to UEs 102 in an area that is not within a boundary of a cell or an area not predefined by a cell or a cell boundary. For example, assume that TRP 310 serves multiple UEs 102, where one of the UEs 102 is inside an area that is associated with a cell and the other UE 102 is outside the area. In this example, the total area in which TRP 310 serves the UEs 102 is outside of a single cell. In this context, "connections" does not include any temporary connections between UEs 102 and wireless stations during handoffs. For a conventional access network, a wireless station is assigned to a cell and services only those UEs within the cell.

In access network 104 shown in FIG. 3, a path from a TRP 310 to core network 106 may be identified by a quadruple (i, j, n, m), where m is index of the TRP (i.e., a TRP identifier (TRP ID), n is an index for the SG, j is an identifier the TTG, and i is an identifier for the BHG in access network 104. For each path that can be identified by a path quadruple, access network 104 may provide various synchronization and/or scheduling states.

For example, given a path quadruple of (1, 3, 2, 7), access network 104 may determine the synchronization scheduling relation information (SSR) of the first BHG 304 in access network 104, third TTG, second SG 308, and seventh TRP 310. One example SSR may indicate: (unsynchronized (non-ideal) backhaul, synchronized transmission timing, and independent scheduling for the SG. Other example SSRs include: Unsynchronized (i.e., "non-ideal") backhaul, synchronization-capable transmission timing, independent scheduling; synchronized (i.e., "ideal") backhaul, synchronization-capable transmission timing, independent scheduling; and (synchronized (i.e., "ideal") backhaul, synchronization-capable transmission timing, joint scheduling.

The SSRs for a path may hold for all frequency layers and may indicate how data over a particular path may be synchronized or behave with respect to scheduling. For example, at a TRP 310, data over the path quadruple of (1, 1, 3, 2) may be jointly scheduled with the path quadruple of (1, 1, 3, 5). Because each TRP 310 can provide one or more beams to UE 102, given path quadruples for multiple TRPs, the UE 102 may determine and/or access a pool of beams associated with TRPs identified by the path quadruples. Associations between SSRs and paths may be adapted or modified dynamically, for example, via MAC-Control Element, Downlink Control Information (DCI), or Radio Resource Control (RRC) messages.

For UE 102 to connect with access network 104 and to maintain its connectivity via TRP 310s, UE 102 may use SSR and what is typically referred to as Quasi Co-Location (QCL) information to determine the best transmission mode, within its capability, and convey its state to access network 104. SSR is semi-static and may be broadcast from network 104 to a region that includes UE 102 or unicast to UE 102. A UE unicast signal may be coded (e.g., scrambled, masked, etc.) by its own identify, a network identify, and a TRP identity. When UE 102 receives SSR, UE 102 may use the received information to determine the feasibility of communications and/or the UE/network communications capability.

QCL information pertains to a common set of values that characterize two or more communication ports or antennas. Two antenna ports are said to be quasi co-located if properties of one channel can be inferred from those of another channel Information that may be used to infer the properties is QCL information. QCL information may include, for example, Doppler Shift, Doppler Spread, average delay, receiver parameters, etc. Thus, QCL can be used to indicate conditions of different antenna ports or antennas.

SSR may provide information on BHG, TTG, SG, and TRPs regarding: packet timing (same or separate processing chain); whether transmission/reception is synchronous or asynchronous (same or separate Fast-Fourier Transform engine); control mapping (e.g., Physical Downlink Control Channel (PDCCH), Physical Uplink Control Channel (PUCCH, data buffering and processing buffered data, etc.); and QCL-based determination of communication capability via the identified TRP, depending on the QCL processing capability of UE 102. Thus, SSR may be used for objective optimization of various parameters, such as throughput, latency, etc. The optimization process may be dynamic and adaptive changes may be signaled from UE 102 and/or network 104. For example, BHG, TTG, SG, and TRP-related information in SSR may be used to determine, respectively: network coding scheme (e.g., asynchronous DC-like schemes); synchronous DC-like schemes; CA-like schemes and/or single-DCI/multi-DCI for multi-TRP-like schemes, NCJT; and JCT for multi-TRP.

Figure 4:
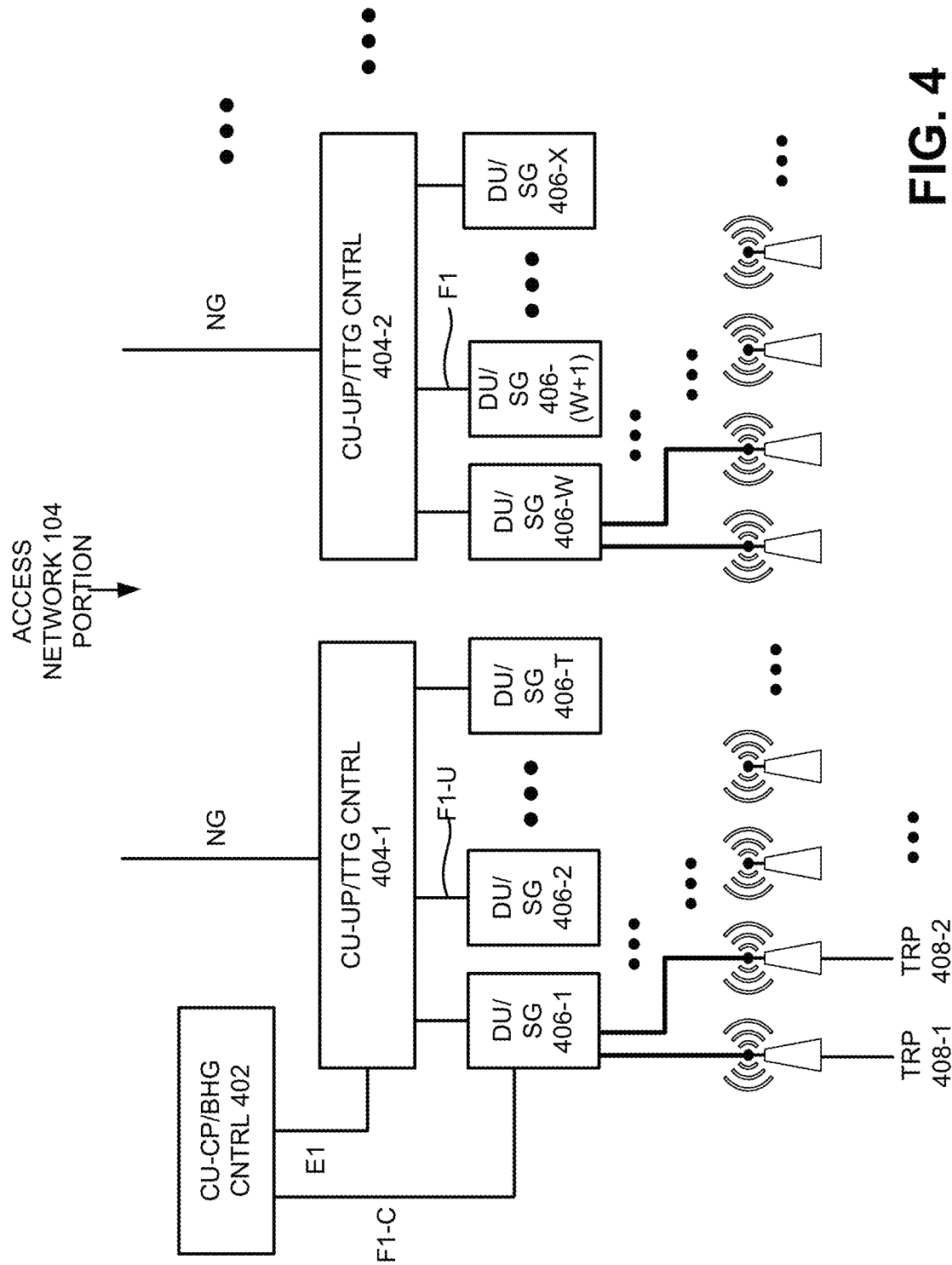
FIG. 4 depicts exemplary components of an access network, according to an implementation.

FIG. 4 depicts exemplary components of access network 104 according to an implementation. In this implementation. as shown, access network 104 may include Central Unit-Control Plane (CU-CP) for forming a BHG. A TTG 306. comprise a Central Unit-User Plane (CU-UP) 404-1, and SGs 308 may comprise Distributed Units (DUs) 406-1 through 406-T. Access network 104 may also comprise TRPs 408. Depending on the implementation, access network 104 may include fewer, additional, different, or a different arrangement of components than those illustrated in FIG. 4. Additionally, some of these components may be implemented in access network 104 without being confined to a particular piece of hardware. For example, CU-CP 402 and CU-UP 404 may be implemented in an edge devices, at a data center as part of V-RAN or C-RAN, or as part of a network slice through network function virtualization.

CU-CP 402 may perform control plane signaling associated with managing DU 406 over F1-C interface. CU-CP 402 may signal to DU 406 over a control plane communication protocol stack that includes, for example, F1AP (e.g., the signaling protocol for F1 interface between a CU and a DU). CU-CP 402 may include protocol layers comprising: Radio Resource Control (RRC) layer and a Packet Data Convergence Protocol-Control Plane (PDCP-C). DU 406 may include corresponding stacks to handle/respond to the signaling (not shown).

CU-UP 404 may perform user plane functions associated with managing DU 406 over the F1-U interface. CU-UP 404 may interact with DU 406 over a user plane communication protocol stack that includes, for example, General Packet Radio Service Tunneling Protocol (GTP)-User plane, the User Datagram Protocol (UDP), and/or IP. DU 406 may include corresponding layers to handle/respond to messages from CU-UP 404 (not shown). CP-UP 404 may include processing layers that comprise a Service Data Adaptation Protocol (SDAP) and a PDCP-User Plane (PDCP-U). CU-UP 404 and CU-CP 402 communicate over E1 interface, for example, for exchanging bearer setup messages.

CU-CP 402 and CU-UP 404 (collectively referred to as CU) may communicate with the components of core network 106 through S 1/NG interfaces and with other CUs through X2/Xn interfaces.

DU 406 may provide support for scheduling data for one or more radio beams at TRPs 408. DU 406 may handle UE mobility, from a DU to a DU, gNB to gNB, beam to beam, etc. TRP 408 may perform physical layer functions, such as antenna functions, transmissions of radio beams, etc.

In FIG. 4, CU-CP 402, CU-UP 404, and DU 406 may include, respectively, BHG Control 402, TTG control 404, and SG control 406. The BHG Control 402, TTG Control 404, and SG Control 406 may set and monitor values of parameters that are associated with backhauls, TTGs, DUs, and TRPs. For example, the BHG Control 402 may coordinate different CU-UPs 404 to ensure their NG interfaces to core network 106 are synchronized when different portions of UE data arrive through different CU-UPs 404 (e.g., during multi-bearer DC or DC-like communication).

Similarly, TTG Control 404 may manage multiple DUs 406 that send/receive data through radio bearers. The data from/to the radio bearers may be sent to or received synchronously from the data bearer during, for example, a single-data bearer DC or DC-like connectivity with UE 102. SG Control 406 may coordinate multi-TRPs 408 to perform, for example, joint coherent transmissions (JCT), non-joint coherent transmissions (NJCT).

Each of BHG Control 402, TTG Control 404, and SG Control 406 may set and/or monitor values of different operational parameters of, respectively, BHG 304, TTG 306, and SG 308.

The implementation shown in FIG. 4 is exemplary. Depending on the implementation, access network 104 may include different BHG-, TTG-, and/or SG-related components and connectivity configurations. For example, in FIG. 4, CU-UP 404 may be connected to a particular CU-CP 402, and each DU 406 may be connected to particular TRPs 310. In different implementations, BHG and TTGs may be capable of selecting to which BHGs and TTG to connect. Similarly, a SG may transmit/receive via one or more of TRPs 408 that the SG selects.

Figure 5A:
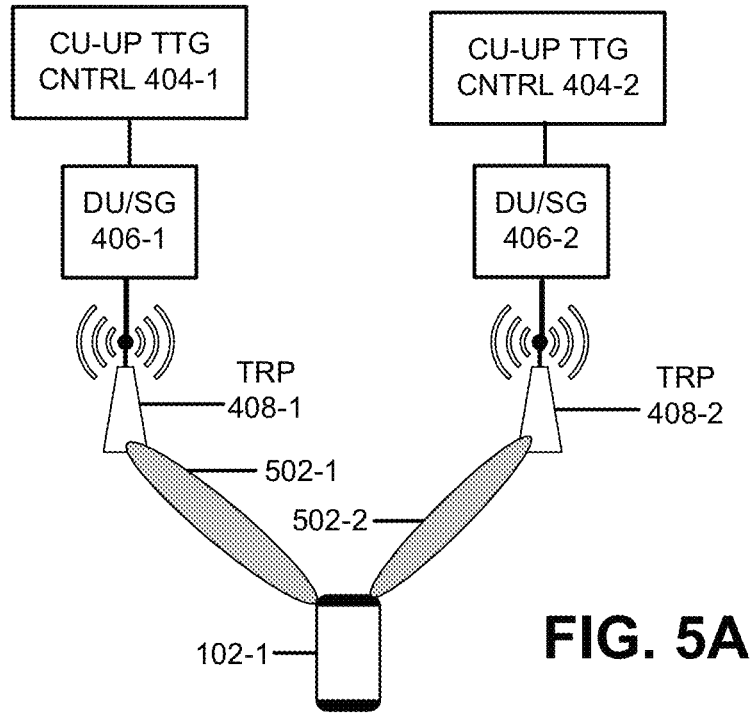
FIGS. 5A and 5B illustrate exemplary communication paths through a transmission timing group (TTG), synchronization groups (SG), and different TRPs, according to an implementation.
Figure 5B:
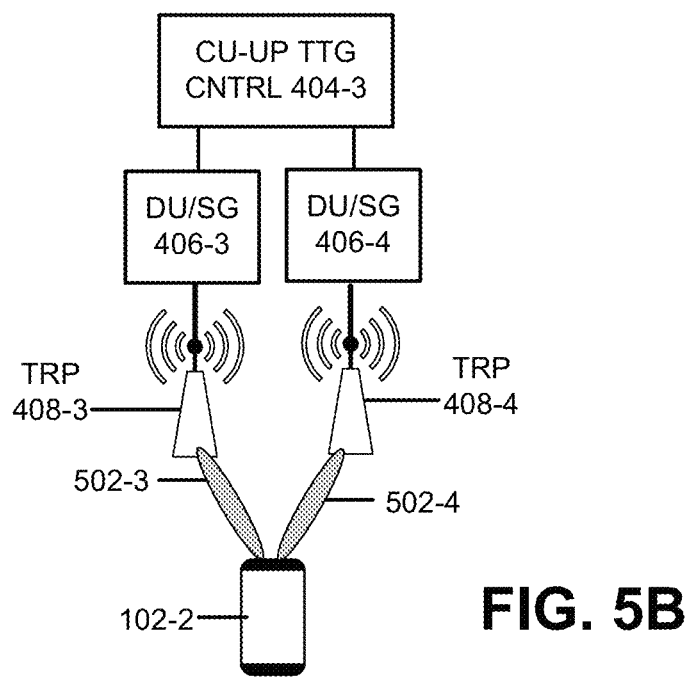

FIGS. 5A and 5B illustrate exemplary communication paths through TTGs 306, SGs 308, and TRPs 310 according to different implementations. These implementations are consistent with the implementation shown FIG. 4. Other implementations are possible, and the example of FIGS. 5A and 5B do not limit the implementations described herein.

For the implementation of FIG. 5A, CU-CP 402 (not shown in FIG. 5A) may synchronize CU-UP 404-1 and CU-UP 404-2 and set up a DC-like connection with UE 102-1. In particular, CU-UP 404-1 is linked to DU 406-1 that sends/receives data through TRP 408-1 to/from UE 102-1 over a beam 502-1; and CU-UP 404-2 is linked to DU 406-2 that sends/receives data through TRP 408-2 to/from UE 102-1 over another beam 502-2. Each of DUs 406-1 and 406-2 may or may not schedule transmissions independently (i.e., DU 406-1 does not or does directly communication with DU 406-2 to schedule data transmissions to UE 102). Although different portions of data to/from UE 102 pass through different TTG Controls (i.e., CU-UP 404-1 and CU-UP 404-2), the data are appropriately organized (synchronized) to reach the correct destination in, for example, data network 108. Beams 502-1 and 502-2 may or may not be formed via different RATs.

In FIG. 5B, CU-UP 404-3 may synchronize DU 406-3 and DU 406-4, to set up DC-like links with UE 102-2. In contrast to the configuration in FIG. 5A, in FIG. 5B, the TTG Control (e.g., CU-UP 404-3) performs the synchronization. DU 406-3 sends/receives data through TRP 408-3 to/from UE 102-2 over a beam 502-3; and DU 406-4 sends/receives data through TRP 408-4 to/from UE 102-2 over another beam 502-4. Each of DUs 406-3 and 406-4 may schedule transmissions independently. Although different portions of data to/from UE 102 pass through different SG Controls (i.e., DU 406-3 and DU 406-4), the data are appropriately synchronized at CU-UP 404-3. Beams 502-3 and 502-4 may or may not be formed via different RATs.

Figure 6:
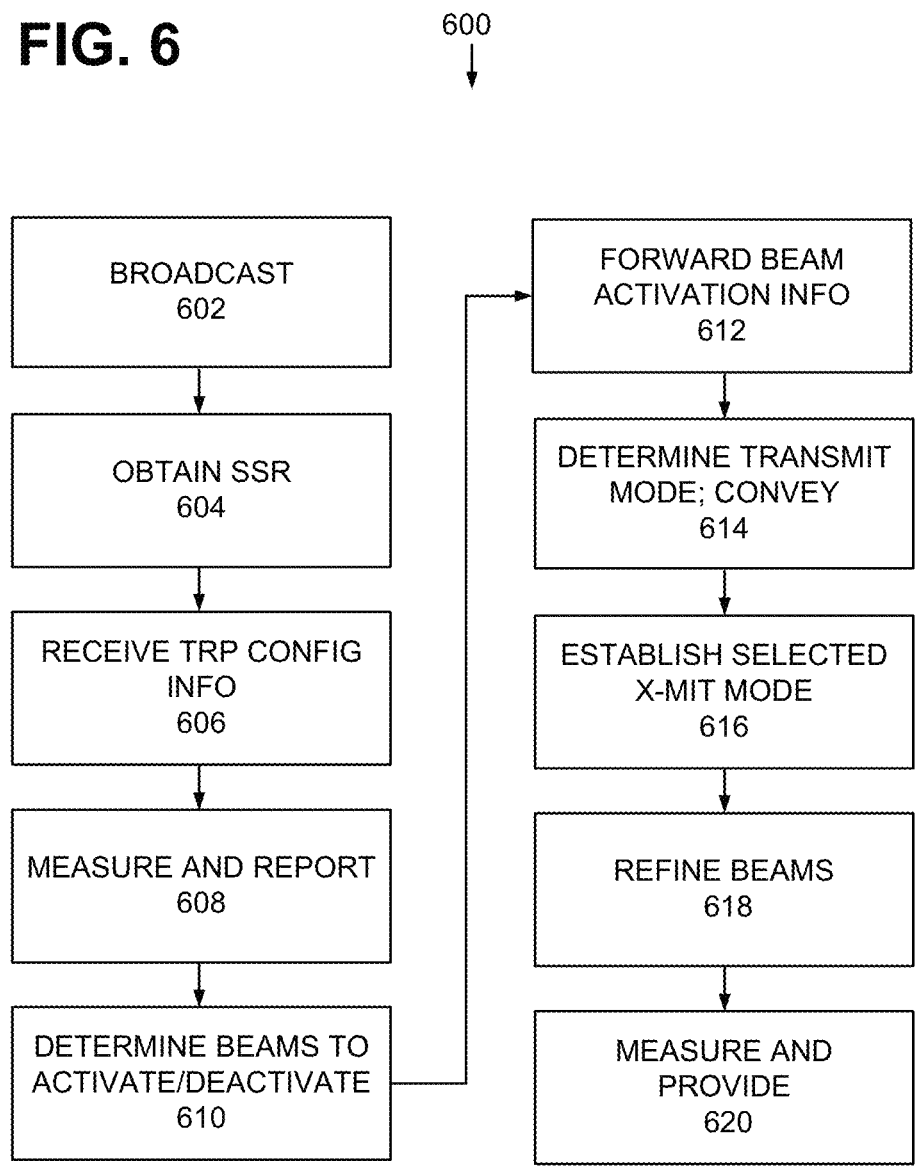
FIG. 6 is a flow diagram of an example process that is associated with a cell-less wireless network, according to an implementation.

FIG. 6 is a flow diagram of an example process 600 that is associated with a cell-less wireless network according to an implementation. Process 600 may be performed by one or more of the components shown in FIGS. 3, 4, 5A and/or 5B. As shown, process 600 may include TRPs broadcasting reference signals (e.g., Synchronization Signal Block (SSB))

(block 602). In response, UE 102 may obtain Synchronization and Scheduling Relation information (SSR) provided via the broadcast signals and the SSBs (block 604). In some implementations, UE 102 may obtain only part of the SSR from the broadcast and acquire the full SSR after accessing the network 104, through dedicated signaling such as RRC signaling.

Process 600 may further include UE 102 receiving configuration information for TRPs through the RRC connection (block 606). After the receipt, UE 102 may measure and report beam quality information for the TRPs 408 (block 608). In response to the information from UE 102, access network 104 may determine what TRP beams to activate and/or which TRP beams to deactivate (block 610). Access network 104 may forward the beam activation/deactivation information (which identifies active beams) to UE 102 (e.g., via MAC-CE) (block 612). In some implementations, UE 102 may receive additional dynamic information about one or multiple TRP beams in the activated pool via other signals, such as Downlink Control Information (DCI).

Process 600 may further include access network 104 determining a transmission mode (also referred to as transmit mode) for the TRPs (block 614). A transmission mode may include, for example, asynchronous or synchronous DC-like transmission, a CA-like transmission, multi-DCI/single DCI-based transmission for multi-TRPs (e.g., for non-coherent joint transmission or coherent joint transmission). Determining the optimum transmission mode may include using the SSR associated with the TRPs 408. Additionally, access network 104 may code the Demodulation Reference Signal (DMRS) to convey the channel condition, from which UE 102 may deduce the transmission mode (block 614).

Process 600 may further include access network 104 and UE 102 establishing the selected transmission mode for the connection (block 616). During the establishment of the transmission mode or thereafter, the TRPs may refine beams (block 618) via, for example, Tracking Reference Signal (TRS)-based refinement; UE 102 may perform beam refinement; or both the TRPs and UE 102 may perform a joint beam refinement. The beam refinement may include, for example, beam reshaping and/or adjusting beam directions. Furthermore, UE 102 may measure the relative strengths of the beams and provide channel state information (CSI) to access network 104 (block 620), to assist the TRPs 408 in maintaining the optimum beam states.

Figure 7:
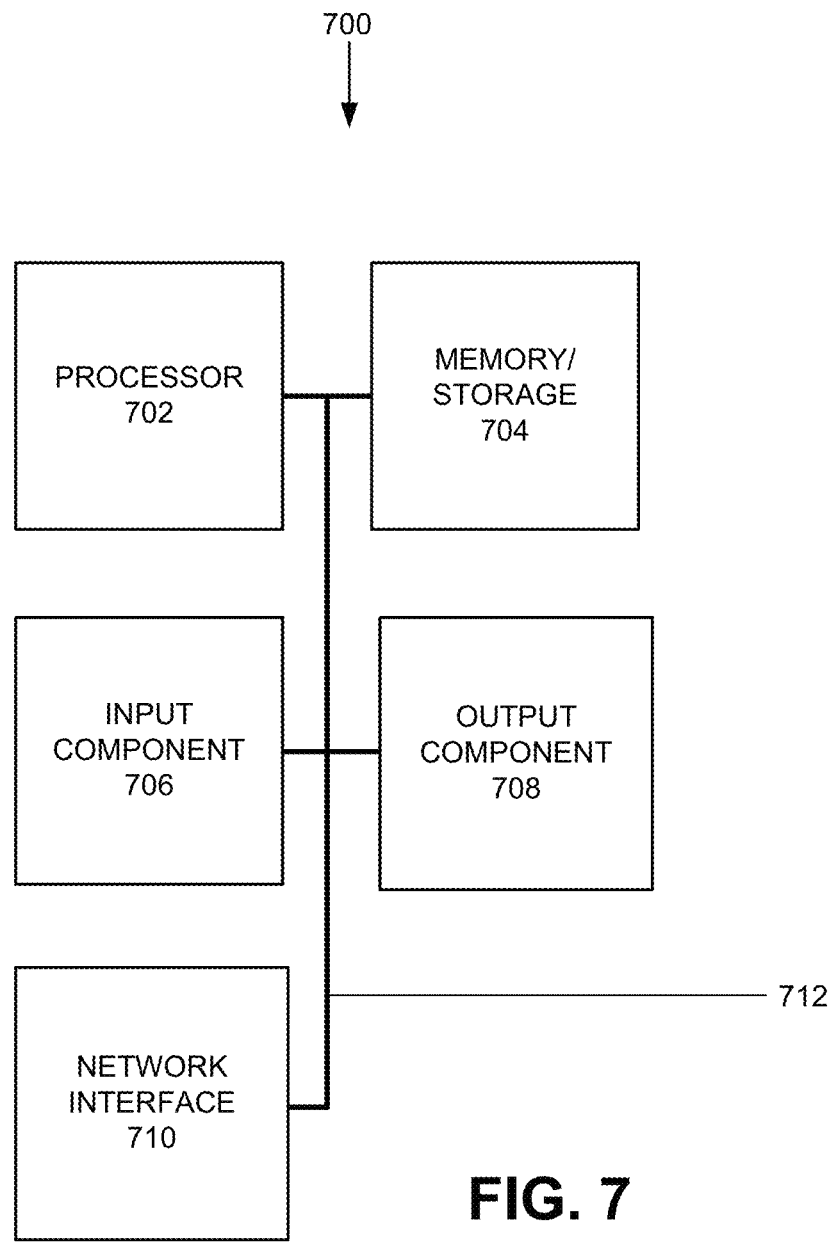
FIG. 7 depicts components of an example network device, according to an implementation.

FIG. 7 depicts example components of an example network device 700. Network device 700 corresponds to or is included in UE 102 and any of the network components of FIGS. 1-4, 5A, and 5B (e.g., a router, a network switch, servers, gateways, gNB, eNB, CU-CP 402, CU-UP 404, DU 406, BHG 304, TTG 306, SG 308/406, TRP 310/408, etc.). As shown, network device 700 includes a processor 702, memory/storage 704, input component 706, output component 708, network interface 710, and communication path 712. In different implementations, network device 700 may include additional, fewer, different, or a different arrangement of components than the ones illustrated in FIG. 7. For example, network device 700 may include a display, network card, etc.

Processor 702 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 700 and/or executing programs/instructions.

Memory/storage 704 may include static memory, such as read only memory (ROM), and/or dynamic memory, such as random access memory (RAM), or onboard cache, for storing data and machine-readable instructions (e.g., programs, scripts, etc.).

Memory/storage 704 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 704 may be external to and/or removable from network device 700. Memory/storage 704 may include, for example, a Universal Serial Bus (USB) memory stick, a dongle, a hard disk, off-line storage, a Blu-Ray® disk (BD), etc. Memory/storage 704 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 706 and output component 708 may provide input and output from/to a user to/from network device 700. Input and output components 706 and 708 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 700.

Network interface 710 may include a transceiver (e.g., a transmitter and a receiver) for network device 700 to communicate with other devices and/or systems. For example, via network interface 710, network device 700 may communicate with wireless station 110.

Network interface 710 may include an Ethernet interface to a LAN, and/or an interface/connection for connecting network device 700 to other devices (e.g., a Bluetooth interface). For example, network interface 710 may include a wireless modem for modulation and demodulation. Communication path 712 may enable components of network device 700 to communicate with one another.

Network device 700 may perform the operations described herein in response to processor 702 executing software instructions stored in a non-transient computer-readable medium, such as memory/storage 704. The software instructions may be read into memory/storage 704 from another computer-readable medium or from another device via network interface 710. The software instructions stored in memory or storage (e.g., memory/storage 704, when executed by processor 702, may cause processor 702 to perform processes that are described herein. For example, UE 102, CU-CP/BHG Control 402, CU-UP/TTG Control 404, DU/SG Control 406, TRPs 408, wireless stations 110 and/or other components described with respect to FIGS. 1-5B may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the process illustrated in FIG. 6, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A radio access network (RAN) comprising:
at least one transmission-reception point (TRP) configured to provide wireless connections to one or more User Equipment devices (UEs) in an area, wherein the area is not within a cell and is not predefined by a cell boundary, and
wherein the RAN is configured to:
broadcast Scheduling and Synchronization Relation (SSR) information to a UE, wherein the SSR information includes an identifier that specifies at least a group of backhaul paths from the RAN to a core network; and
establish with the UE a transmission mode for the at least one TRP.

2. The RAN of claim 1, further configured to:
perform refinement of a beam from the at least one TRP to the UE.

3. The RAN of claim 2, wherein when the RAN performs the beam refinement, the RAN is configured to:
receive channel state information (CSI) from the UE.

4. The RAN of claim 1, wherein the RAN comprises at least one of a cloud RAN (C-RAN) or a virtual RAN (V-RAN).

5. The RAN of claim 1, wherein when the at least one TRP is in the transmission mode, a first TRP of the at least one TRP and a second TRP of the at least one TRP provide dual connectivity (DC) from the RAN to the UE over the first TRP and the second TRP, wherein the RAN includes a network component for coordinating transmission to the UE at the first TRP and the second TRP.

6. The RAN of claim 1, wherein when the at least one TRP is in the transmission mode, the at least one TRP is configured to:
perform carrier aggregation with the UE.

7. The RAN of claim 1, wherein a first TRP of the at least one TRP and a second TRP of the at least one TRP are configured to perform coherent joint transmission to the UE.

8. The RAN of claim 1 further comprising:
a backhaul group (BHG) that includes a transmission timing group (TTG) comprising a scheduling group (SG) that includes the at least one TRP,
wherein the SSR information includes information that specifies synchronization and scheduling information for the BHG, the TTG, the SG, and the at least one TRP.

9. The RAN of claim 1, wherein the RAN is further configured to:
exchange configuration information for the at least one TRP over a Radio Resource Control (RRC) connection with the UE.

10. The RAN of claim 1, wherein the RAN is further configured to:
forward, to the UE, information that describes or identifies one or more beams to be activated between the at least one TRP and the UE.

11. A method comprising:
broadcasting Scheduling and Synchronization Relation (SSR) information to a User Equipment device (UE); and
establishing with the UE a transmission mode for a transmission-reception point (TRP) included in a Radio Access Network (RAN),
wherein the TRP is configured to provide wireless connections to one or more UEs in an area, wherein the area is not within a cell and is not predefined by a cell boundary, and wherein the SSR information includes an identifier that specifies at least a group of backhaul paths from the RAN to a core network.

12. The method of claim 11, further comprising:
performing refinement of a beam from the TRP to the UE.

13. The method of claim 12, wherein performing the beam refinement includes:
receiving channel state information (CSI) from the UE.

14. The method of claim 11, wherein the RAN comprises at least one of a cloud RAN (C-RAN) or a virtual RAN (V-RAN).

15. The method of claim 11, further comprising:
providing dual connectivity (DC) from the RAN to the UE via the TRP and a second TRP, wherein the RAN includes a network component for coordinating data transmission to the UE at the TRP and the second TRP.

16. The method of claim 11, further comprising:
performing carrier aggregation with the UE.

17. The method of claim 11, further comprising:
performing a coherent joint transmission, at the TRP and a second TRP, to the UE.

18. The method of claim 11, wherein the RAN comprises a backhaul group (BHG) that includes a transmission timing group (TTG) comprising a scheduling group (SG) that includes the TRP, and wherein the SSR information includes information that specifies synchronization and scheduling information for the BHG, the TTG, the SG, and the TRP.

19. The method of claim 11, further comprising:
exchanging configuration information for the TRP over a Radio Resource Control (RRC) connection with the UE.

20. A non-transitory computer-readable medium comprising computer-executable instructions, when executed by one or more processors, cause the one or more processors to:
broadcast Scheduling and Synchronization Relation (SSR) information to a User Equipment device (UE); and
establish with the UE a transmission mode for a transmission-reception point (TRP) included in a Radio Access Network (RAN),
wherein the TRP is configured to provide wireless connections from the RAN to one or more UEs in an area, wherein the area is not within a cell and is not predefined by a cell boundary, and wherein the SSR information includes an identifier that specifies at least a group of backhaul paths from the RAN to a core network.

* * * * *